United States Patent
Gutierrez et al.

(10) Patent No.: US 7,263,417 B2
(45) Date of Patent: Aug. 28, 2007

(54) USER ADAPTIVE AUTOMATED PRE-TRIP INSPECTION SYSTEM

(75) Inventors: Francisco A. Gutierrez, Fort Wayne, IN (US); Kevin R. Carlstrom, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 575 days.

(21) Appl. No.: 10/953,026

(22) Filed: Sep. 29, 2004

(65) Prior Publication Data

US 2006/0069475 A1    Mar. 30, 2006

(51) Int. Cl.
*G01M 17/00* (2006.01)
*G21C 17/00* (2006.01)
*G06F 17/00* (2006.01)

(52) U.S. Cl. ................ 701/29; 701/33; 701/35; 702/183; 340/539.24

(58) Field of Classification Search ............. 701/29, 701/2, 30, 32, 33, 35; 702/179, 182, 183, 702/184, 185; 714/25; 707/102
See application file for complete search history.

(56) References Cited

U.S. PATENT DOCUMENTS

| 5,680,328 | A | 10/1997 | Skorupski et al. |
|---|---|---|---|
| 6,064,299 | A * | 5/2000 | Lesesky et al. ............. 340/431 |
| 6,650,977 | B2 | 11/2003 | Miller |
| 6,671,594 | B2 | 12/2003 | Miller |
| 6,671,646 | B2 | 12/2003 | Manegold et al. |
| 2002/0004747 | A1* | 1/2002 | Nishioka ..................... 705/14 |
| 2003/0050764 | A1* | 3/2003 | Manegold et al. .......... 702/127 |
| 2005/0143882 | A1* | 6/2005 | Umezawa ..................... 701/29 |

* cited by examiner

*Primary Examiner*—Tan Q. Nguyen
(74) *Attorney, Agent, or Firm*—Jeffrey P. Calfa; Gerald W. Askew; Susan L. Lukasik (57) ABSTRACT

A plurality of automated vehicle inspection routines are provided keyed by user identification. Implementation relies on presence of a programmable computer installed on the vehicle with user input/output interfaces through which a user may enter user identification. Once entered the computer matches the user to an inspection routine, which may be customized to the particular individual, or which may apply to a class of users.

9 Claims, 5 Drawing Sheets

CDL VEHICLE INSPECTION AND BASIC CONTROL SKILLS REPORT

NAME _______________________________________ DOB _________

ADDRESS ____________________________________________________

SS# _______________________________ SIGNATURE ______________

| VEHICLE MAKE | VEHICLE PLATE # | VEHICLE (GVWR) | TRAILER PLATE # | TRAILER (GVWR) | AIR BAGS ☐YES ☐NO |
|---|---|---|---|---|---|

ENGINE COMPARTMENT
- any leaks ☐
- oil level ☐
- coolant level ☐
- power steering fluid ☐
- water pump ☐
- alternator ☐
- air compressor ☐

CAB CHECK/ENGINE START
- clutch/gearshift ☐
- air pressure gauge ☐
- oil pressure gauge ☐
- ammeter/voltmeter ☐
- mirrors, windshield ☐
- emergency equip.f-e-t ☐
- steering play ☐
- wipers ☐
- lighting indicators ☐
- horn(s) ☐
- heater/defroster ☐
- parking brake check ☐
- airbrake ck (loss/warn/TPV-PV) ☐

LIGHTS/REFLECTORS
- clearance ☐
- head ☐
- tail ☐
- turn signals ☐
- 4-ways ☐
- brakes ☐
- reflectors ☐

STEERING
- steering box ☐
- steering linkage ☐

FRONT SUSPENSION
- spring/air ☐
- mounts ☐
- shock ☐

FRONT BRAKE
- stack adjustor ☐
- chamber ☐
- hose/line ☐
- drum/disc ☐

FRONT WHEEL
- rim ☐
- tire ☐
- hub oil seal ☐
- lug nuts ☐

SIDE/UNDER VEHICLE
- door/mirror ☐
- fuel tank ☐
- fuel leaks ☐
- drive shaft ☐
- exhaust system ☐
- frame ☐

SCHOOL BUS ONLY
- passenger entry ☐
- emergency exits ☐
- seating ☐

REAR SUSPENSION
- springs/air ☐
- mounts ☐
- shocks/torsion ☐

REAR BRAKE
- stock adjuster ☐
- chamber ☐
- hoses/lines ☐
- drum ☐

REAR WHEEL
- rim ☐
- tire ☐
- seal ☐
- lug nuts ☐
- (spacer) ☐

REAR OF TRUCK/SCHOOL BUS
- splash guards ☐
- doors/ties (truck) ☐

TRACTOR COUPLING AREA
- air/elec lines ☐
- catwalk ☐
- splash guards ☐

COUPLING
- mounting bolts ☐
- locking jaw ☐
- platform ☐
- release arm ☐
- kingpin/apron ☐
- sliding 5th wheel (locking pins) ☐

TRAILER FRONT
- air/elec. connect ☐
- header board ☐

SIDE OF TRAILER
- landing gear ☐
- doors/ties ☐
- frame ☐

WHEEL
- rim ☐
- tire ☐
- seal ☐
- lug nuts ☐
- (spacer) ☐

SUSPENSION
- springs/air ☐
- mounts ☐

BRAKE
- stack adjuster ☐
- chamber ☐
- hoses/line ☐
- drum ☐

REAR OF TRAILER
- doors/ties ☐
- splash guards ☐

COACH/LARGE TRANSIT
- passenger entry ☐
- emergency exit ☐
- seating ☐

DRIVER ENTRY
- doors/mirrors ☐

FRONT SUSPENSION/BRAKES
- level/air leak ☐

FRONT WHEEL
- rim ☐
- tire ☐
- hub oil seal ☐
- lug nuts ☐

SIDE OF VEHICLE
- fuel tank ☐
- compartments ☐

REAR WHEEL
- rim ☐
- tire ☐
- grease seal ☐
- lug nuts ☐
- (spacer) ☐

REAR SUSPENSION/BRAKES
- level/air leak ☐

☐Pass  ☐Fail  ☐Incomplete  Required score ____
Vehicle Inspection Score ____________
Ex. Signature _______________ Date _______

BASIC CONTROL SKILLS (Basic Control Skills Passing Score 9 Errors or Less)

| Right Turn (max score = 6) | | Straight Line Backing | | Alley Deck | | Forward Stop |
|---|---|---|---|---|---|---|
| Pull ups | 0 1 2 3 4 5 | | | Pull ups | 0 1 2 3 4 5 | |
| Encroachments | 0 1 | Pull ups | 0 1 2 3 4 5 | Encroachments | 0 1 2 3 4 5 | Stop Line (2ft) |
| Clearance | 0 1 2 3 4 5 | Encroachments | 0 1 2 3 4 5 | Rear Dock (2ft) | 0 1 | |

| TASK | DRIVER #1 | DRIVER #2 | RENTAL RETURN INSPECTOR | VEHICLE PREP | CHASSIS MECHANIC | ENGINE MECHANIC |
|---|---|---|---|---|---|---|
| HEADLIGHTS FUNCTIONAL - LOW BEAM | X | X |  | X |  |  |
| HEADLIGHTS FUNCTIONAL - HIGH BEAM | X | X |  | X |  |  |
| LEFT HEADLIGHT LENS DAMAGE |  |  | X | X | X |  |
| MOISTURE IN LEFT HEADLAMP |  |  |  | X | X |  |
| RIGHT HEADLIGHT LENS DAMAGE | X | X | X | X | X |  |
| MOISTURE IN RIGHT HEADLAMP | X |  |  | X |  |  |
| FLASHERS FUNCTIONAL | X | X |  | X |  |  |
| LEFT TURN SIGNAL FUNCTIONAL |  |  | X | X | X |  |
| LEFT TURN SIGNAL LENS DAMAGE |  |  |  | X |  |  |
| RIGHT TURN SIGNAL FUNCTIONAL | X | X | X | X | X |  |
| RIGHT TURN SIGNAL LENS DAMAGE | X |  | X | X | X |  |
| GRILL DAMAGED |  |  |  | X |  |  |
| GRILL OBSTRUCTED |  |  |  | X |  |  |
| RADIATOR LEAKING |  |  |  |  |  | X |
| RADIATOR DAMAGED |  |  |  |  |  | X |
| BUMPER DAMAGE |  |  |  | X | X |  |
| BUMPER LOOSE |  |  |  | X | X |  |

FIG. 5

USER ADAPTIVE AUTOMATED PRE-TRIP INSPECTION SYSTEM

BACKGROUND OF THE INVENTION

1. Technical Field

The present invention relates generally to an automated vehicle inspection system and more particularly to an inspection system which automatically reconfigures the inspection protocol to adapt to changes in the identity of the user of a vehicle, potentially of the vehicle operator and of the context of the inspection.

2. Description of the Problem

Commercial transport regulations provide for periodic inspection of, generation of inspection reports relating to, and documentation of maintenance on, commercial vehicles. Inspections include checking numerous operational aspects of the vehicle for conformity to normative operational standards, implementing a check off system for maintenance when indicated by inspection, as well as for scheduled maintenance, and validating the reports generated and keeping copies of the reports for a minimum time period.

Vehicle interactive on board computers (OBC) have been suggested in the art for use in implementing inspection programs directed to meeting these regulations. The OBC suggested in U.S. Pat. No. 5,680,328 was preferably a personal or lap top computer, which is used for receiving data inputs from a driver or maintenance personnel as part of an inspection, and for providing for the collection of data from various sensors placed on the vehicle. However, the '328 patent did not describe a mechanism for actually collecting data from vehicle sensors. The OBC may electronically store inspection reports, and provide copies of the same on a display or be used to reproduce copies in hard copy form.

Contemporary designs for the control and management of vehicle components increasingly rely on methods derived from computer networking. Digital data is exchanged between component controllers over a common physical layer such as a twisted shielded pair of wires. Intelligible communication between two or more device controllers among a greater plurality of devices, all occurring over the common physical layer, depends upon the communicating devices being able to discriminate among messages they receive and to respond to those messages directed to them. Such methods are well known in the art and are part of the standards which the Society of Automotive Engineers (SAE) has published and continues to publish as part of the SAE J1939 protocol and the OBC may readily be configured to operate with these networks by an adaptor. The J1939 protocol provides an open protocol and a definition of the performance requirements of the medium of the physical layer, but also allows for development of proprietary protocols. The SAE J1939 protocol is a specialized application of a controlled area network (CAN) and may be readily implemented utilizing commercial integrated circuits such as the C167 Integrated Circuit from Siemens of Germany.

Digital data communications over serial data paths are an effective technique for reducing the number of dedicated communication paths between the numerous switches, sensors, devices and gauges installed on the vehicles. Multiplexing the signals to and from local controllers and switches promises greater physical simplicity through displacing much of the vehicle wiring harness, reducing manufacturing costs, facilitating vehicle electrical load management, and enhancing system reliability.

Vehicle network communication systems also offer opportunities for increasing automation in vehicle functions. Implementation of an automated inspection system over a vehicle controller area network was taught in detail in U.S. Pat. No. 6,650,977 to Miller. U.S. Pat. No. 6,650,977 is assigned the assignee of the present patent and is expressly incorporated herein by reference. In Miller's system a combination of automatic and prompted data collection helps drivers effect the efficient and complete collection of data required for commercial vehicle operation. The inspection protocol was systemized through a sequence represented by a flow chart. However, notwithstanding partial automation of the inspection process and the assistance provided to a driver by prior art systems in performing the manual aspects of an inspection, there exist other vehicle users who could be helped by improving the adaptability of the inspection programming.

SUMMARY OF THE INVENTION

According to the invention there is provided an automated, user adaptable inspection protocol for execution on a computer installed on a motor vehicle. A plurality of sensors are installed on the vehicle, each sensor generating a signal related to a particular vehicle condition. The motor vehicle includes a controller area network, which provides for collection of data from the sensors. An onboard computer is coupled, either directly or indirectly, to the controller area network for obtaining the vehicle condition related signals. A program for execution on the onboard computer is provided, the program including program means for receiving input of user identification through the input/output interface and further program means for categorizing the user as being one of at least two distinct types. An inspection database accessible by the onboard computer includes tuples identifying vehicle components for inspection and indicating which type of user is to make the inspection. The program also includes program means prompting inspection by the user of vehicle components based on the user type.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is an illustration of one page of a hard copy inspection form.

DETAILED DESCRIPTION OF THE INVENTION

Figure 1:
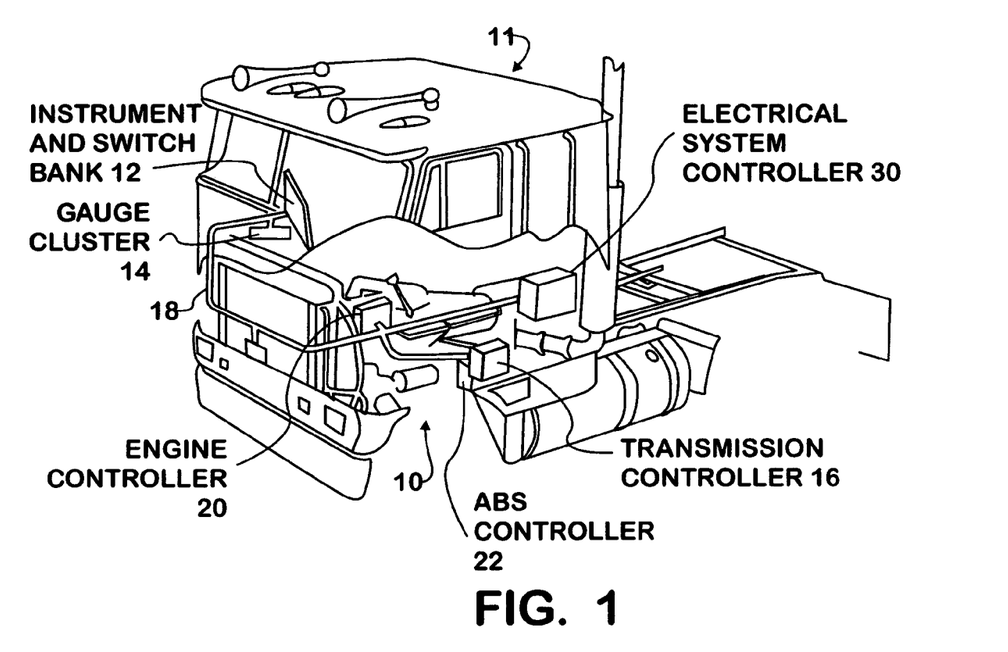
FIG. 1 is a perspective view in partial cutaway of a vehicle truck and an electrical system for the truck.

Referring now to the figures and in particular to FIG. 1, a perspective view of a truck 11 and of an electrical control system 10 installed on the vehicle are shown. Electrical control system 10 comprises a twisted pair (either shielded or unshielded) cable operating as a serial data bus 18. One node of bus 18 is an electrical system controller (ESC) 30, which is the central component of a vehicle electronic control system. ESC 30 manages a number of vocational controllers connected to bus 18 as nodes and positioned on truck 11. Collectively, bus 18 and the various nodes attached thereto form a controller area network (CAN). Truck 11 includes the conventional major systems of a vehicle, including an engine, a starter system for the engine, brakes, a transmission and running lights.

Active vehicle components are typically controlled by one of a group of autonomous, vocational controllers, which include a gauge cluster 14, an engine controller 20, a transmission controller 16, an auxiliary instrument and switch bank 12, and an antilock brake system (ABS) controller 22, all of which are nodes on serial data bus 18 allowing two way communication with ESC 30. Autonomous controllers include local data processing and programming and are typically supplied by the manufacturer of the controlled component. Bus 18 is a twisted pair cable constructed in accordance with SAE standard J1939. Although the autonomous controllers handle many functions locally and can function independently of ESC 30, they report data to ESC 30 and can receive operational requests from ESC 30.

Figure 2:
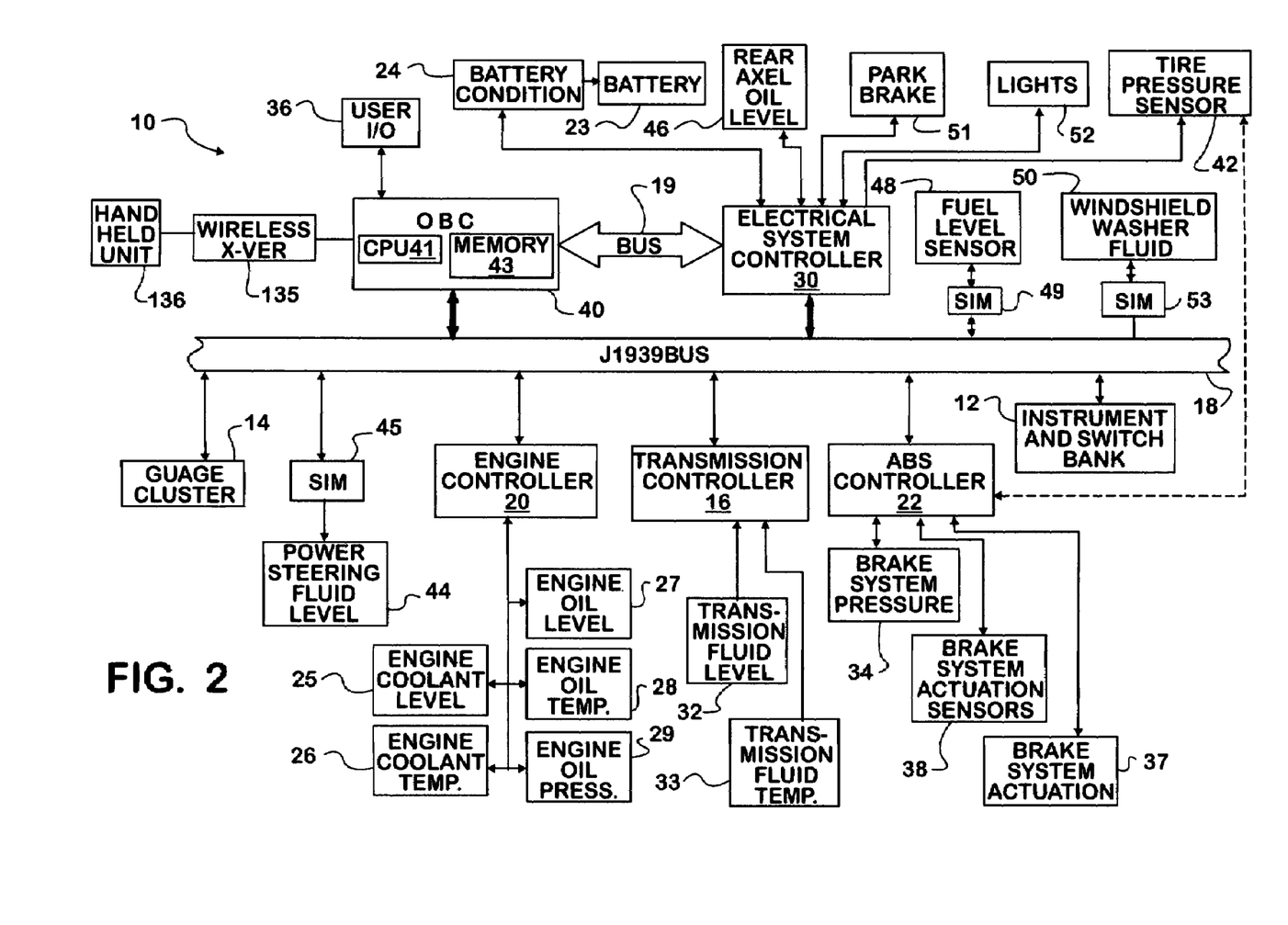
FIG. 2 is a block diagram of a controller area network, an electrical system and battery charging system used to implement the invention on a vehicle.

Referring to FIG. 2, an on board computer (OBC) 40 is also provided on truck cab 11. OBC 40 is based on a conventional personal or portable computer architecture and communicates with ESC 30, either over bus 18, or over a private bus, using an adaptor (not shown). OBC 40 executes an inspection protocol leading to generation of required inspection and maintenance reports.

ESC 30 can collect data from a variety of sources, both over serial data bus 18, or from sensors and devices directly connected the ESC. Although not shown, provision may be made for detection of a trailer if hitched to the base truck 10. One sensor is illustrated as directly connected to a port on the ESC 30 is a rear axle fluid level sensor 46. Electrical system controller 30 also directly actuates lights 52 and can determine whether lights are working from the amount of current drawn. ESC 30 and OBC 40 may communicate over the serial data bus 18 or over a dedicated private bus 19. OBC 40 includes conventional memory 43 (both volatile and non-volatile) and program execution capacities (CPU 41). Thus OBC 40 may be used for the conventional storage of, accessing of, and manipulation of databases.

A serial data bus 18 conforming to the SAE J1939 standard provides for data communication between ESC 30 and an engine controller 20, a transmission controller 16, ABS controller 22, instrument and switch bank 12, a gauge cluster 14 and one or more sensor interface modules. These controllers and modules are in turn connected to one or more sensors which they collect data from and to which they may return data which relate to the sensors to ESC 30. The specific connections between sensors and nodes of the system is exemplary, and other arrangements than the one illustrated are possible.

Physical attributes of vehicle components may be monitored by sensor or require actual human visual inspection. Where a sensor may be installed, inspection may be handled automatically. An engine controller 20 is illustrated connected to an engine coolant level sensor 25, an engine coolant temperature sensor 26, an engine oil level sensor 27, an engine oil temperature sensor 28 and an engine oil pressure sensor 29. Engine coolant level sensor 25 is typically either a pressure or capacitive type sensor, and is located at a position in the coolant system allowing level sensing while the vehicle is stationary. The sensor has either a non-quantitative binary output (1=level acceptable, 0=add coolant), or an analog output indicating percentage full (50% to 120% full) which may be considered to be quantitative. The sensor has a maximum sample rate of 1 measurement per second. Measurements can be broadcast on bus 18 formatted in accordance with J1939 PGN65263. The engine coolant temperature sensor 26 is preferably located at a position in the engine coolant flow system allowing taking temperature readings during engine operation. This sensor has a range of $-40°$ C. to $125°$ C., with a maximum sampling rate of 1 reading per second. Measurements can be taken after the engine has been running a minimum length of time. These measurements can be broadcast on bus 18 formatted in accordance with J1939 PGN 65262.

Engine oil level sensor 27 is either a capacitive or pressure type sensor, and is located at a position in the engine oil flow system allowing engine oil level sensing while the vehicle is level. Sensor 27 has either a binary output (1=level acceptable, 0=add oil), or an analog output indicating percentage full. If the output is analog, analog to digital conversion can be provided. Sensor 27 provides sampling at 2 Hz. Messages containing measurement data are transmitted over bus 18 in accordance with J1939 PGN 65263. Engine oil temperature sensor 28 is located in the oil flow system allowing measurements when the engine is running. Sensor 28 has a temperature operating range of $-40°$ C. to $125°$ C., with a 1 Hz operating cycle. The message data format is J1939 PGN 65262. Engine oil pressure sensor 29 is located in the oil flow system to sample pressure during engine operation. Sensor 29 has an operating range of 0 psi to 200 psi with a sampling rate of 2 Hz. The message format is J1939 PGN 65263.

Transmission controller 16 is connected to a transmission fluid level sensor 32 and, usually, to a transmission fluid temperature sensor 33. Transmission fluid level sensor 32 is typically a capacitive or pressure type sensor, and is located in the transmission fluid flow system to obtain fluid level measurements when the vehicle is level and stationary. Sensor 32 may have an analog output (50% to 120% of full) or a logical binary output (1=level acceptable, 0=add fluid). The sampling rate is 1 Hz. The signal is routed to the transmission controller 16 and broadcast on bus 18 as a J1939 PGN 65272 signal. Transmission fluid temperature sensor 33, while frequently connected to transmission controller 16, is sometimes directly connected to ESC 30. The sensor has an operating range of $-40°$ C. to $125°$ C. and a 1 Hz sampling rate. Measurements, if routed through transmission controller 16, are formatted for data bus 18 as a J1939 PGN 65272.

The anti-lock brake system (ABS) controller 22 controls the brake system and is typically connected to brake system pressure sensors 34 and brake actuation sensor 38, analysis of measurements from which allow determination of brake system functionality. OBC 40 will direct execution of an procedure to determine if the components of the vehicle brake system are functioning correctly. Brake system pressures are broadcast on bus 18 as a J1939 PGN 65274 signal. The OBC 40 can issue instructions to ESC 30, some for further transmission to the appropriate controller, to set and hold engine speed, to depress or pump the brakes (via brake system actuation 37) and for setting and releasing the parking brake 51. Alternatively, OBC 40 may prompt the driver/operator to carry out these tasks by the user I/O interface 36.

A power steering fluid level sensor 44 is located in a power steering fluid reservoir (not shown) and may be connected either to ESC 30, to engine controller 20, or, as illustrated here, to a sensor interface module (SIM) 45, which communicates with ESC 30 over bus 18. The sensor has either a binary output (1=level acceptable, 0=add fluid), or an analog output indicating percentage full (from 50% to 120%). The sensor sampling rate is 1 Hz. Transmission of the data is broadcast on bus 18 as a J1939 PGN 65272 message.

Fuel level sensors 48 are located in the vehicle's fuel tanks (not shown) and may be connected either to ESC 30, or, as illustrated here, to a SIM 49, which communicates with ESC 30 over bus 18. The sensor has an analog output indicating percentage full (from 0% to 100%). The sensor sampling rate is 1 Hz. SIM 49 provides analog to digital conversion of the sensor output and broadcast of a data message on bus 18 as a J1939 PGN 65276 message.

A windshield washer fluid level sensor 50 is located in a windshield washer fluid reservoir (not shown) and is typically connected to a SIM 53, which communicates with ESC 30 over bus 18. The sensor has a binary output (1=level acceptable, 0=add fluid). The sensor sampling rate is 1 Hz. Transmission of the data is broadcast on bus 18 as a J1939 PGN 65276 message.

Electrical system controller (ESC) 30 is represented as communicating directly with a number of devices. Such connections may be provided via ports which may be configured as power supply ports or serial data ports. Vehicle lights 52 are powered directly from ports on ESC 30. The operational integrity of vehicle lights 52 may be determined by current drawn. Other devices or sensors may similarly be directly connected to ESC 30, or they may be connected to bus 18 by a sensor or device interface module allowing data to be broadcast to ESC 30, or devices and sensors may be handled by one of the other autonomous controllers, such as engine controller 20. Rear axle oil level sensor 46 is connected either directly to ESC 30, or by a sensor interface module to bus 18. Sensor 46 may have either an analog output (50% to 120% of full), converted to digital data, or a binary output (1=level acceptable, 0=add oil). The maximum sampling rate is 1 Hz. The J1939 specification does not assign a message format for rear axle differential oil level, requiring a proprietary message format if transmission of data is handled by a SIM.

ESC 30 is connected to a battery condition sensor 24. Battery condition sensor 24 preferably represents a system comprising ammeters coupled to battery leads, battery voltage sensing and temperature sensors. The determination of battery capacity and charge entails execution of an algorithm and reference to battery performance and history tables. The complexity of the system may vary from application to application and the system may, in some circumstances, be different. This algorithm may be executed by OBC 30, which also provides for storage of a condition evaluation algorithm and the needed tables on memory 43. OBC provides a CPU 41 to execute the algorithm. Data relating to battery 23 is passed through ESC 30 from battery condition sensor 24.

ESC 30 is also connected to a tire pressure sensor 42. Tire pressure sensing may be provided for in a number of ways, including inferential pressure measurement based on relative tire rotational velocities (in which case measurements may be handled by the ABS controller 22), or by direct methods, such as battery powered sensors mounted in the tires, in which case the pressure measurements may be directly communicated by a connection between the sensors 42 and ESC 30. Alternatively, the user may be prompted to take air pressure measurements. A gauge cluster 14 and an instrument and switch bank 12 communicate with ESC 30 over data bus 18. Additional components may be attached to bus 18 and accommodated by the inspection routine if deemed important, such a pump controller on a fuel tanker.

FIG. 3 illustrates an inspection form 400 of a prior art type routinely used by a truck driver. It is reproduced here to indicate vehicle systems which require human, visual inspection, notwithstanding partial automation of the vehicle.

In the present invention driver/operator inputs and prompts are handled by user I/O interface 36, which may be implemented in a touch screen display, conventional displays, and keyboards or pads. I/O interface 36 is under the direct control of OBC 40, accepts driver/operator entry of an identification code, indication of task completions, including in cab and walk around inspection items, and further directs aspects of the inspection routine which cannot be economically automated, for example, disk brake pad depth. Driver acknowledgment of critical errors requiring immediate attention is provided. Prompts or buttons in interface 36 allow for this. OBC 40 can provide for storage of reports in memory 43, which includes volatile and non-volatile sections. Alternatively, the interface 36 may include a printer allowing hard copies of the reports to be printed. Typically, inspection reports are stored as time and user stamped databases exemplified by a Result database described below. As described above, some aspects of the inspection procedure can require driver actions, such as pumping or depressing the brakes, which are prompted on I/O interface 36. For walk around portions of the inspection a wireless handheld unit 136 may by be used by the driver to receive prompts from OBC 40 via a wireless communication card 135.

Figure 4:
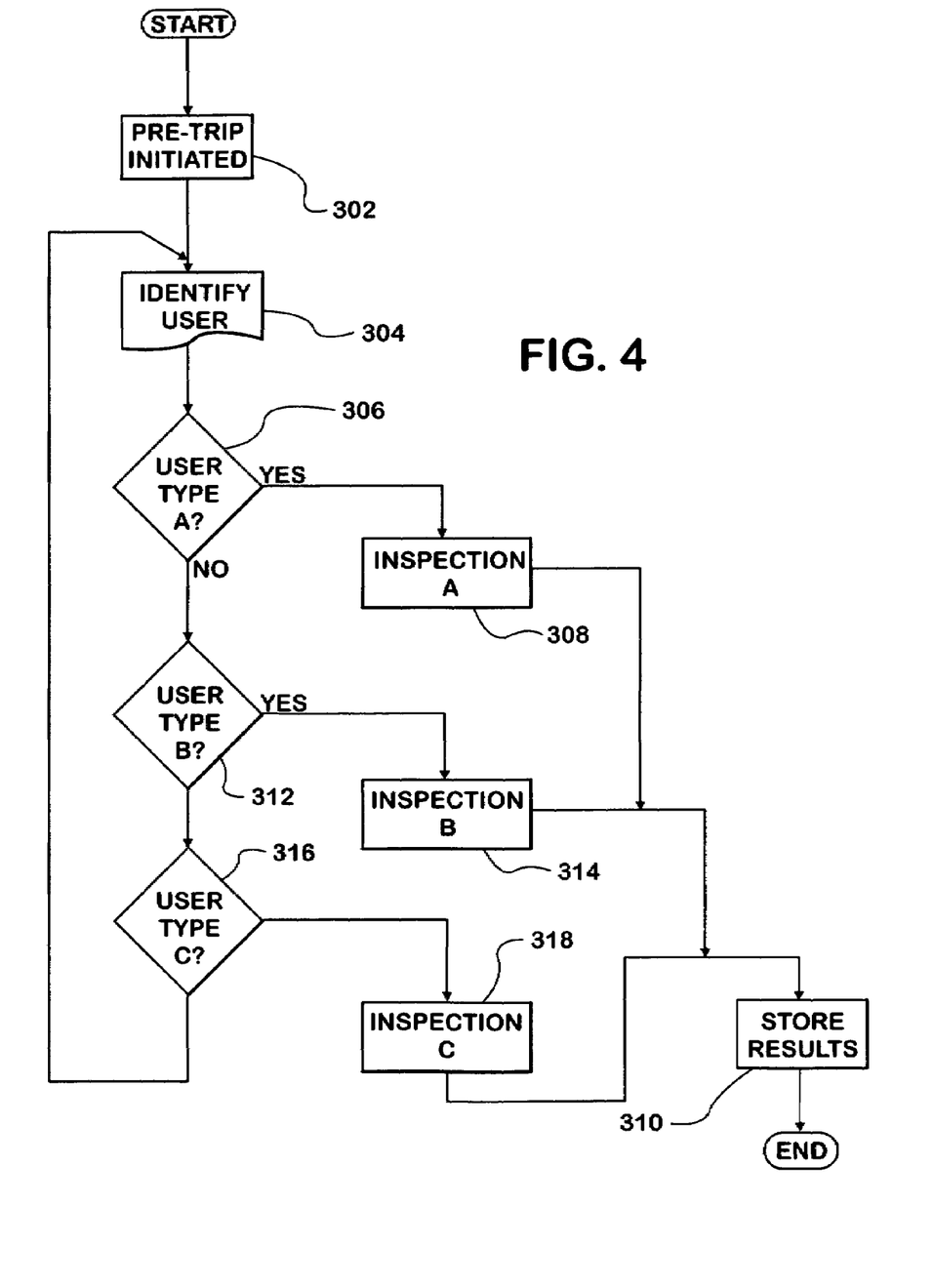
FIG. 4 is a high level flow chart providing for operator identification upon vehicle prestart routine.

OBC 40 may be programmed to receive operator inputs and to guide an operator through an inspection routine using handheld unit 136 or the user I/O 36. The preferred embodiment of the present invention provides that different inspection routines be established for different classes of users, however, implementation of the invention can provide for tailoring inspections by operator and context. Referring to FIG. 4, a flow chart illustrates identification of a user upon initiation of a pre-trip operational sequence. The pre-trip sequence may begin automatically each time a vehicle is moved after a stop of predetermined minimum duration, upon a change of driver, upon engine start, at certain times of the day, or by combinations of these factors (step 302) and may include operations not relevant to our purposes here.

For purposes of an example it may be assumed that operators/users of a vehicle fall into one of three classes, which may be taken to be driver (class A), general mechanic (class B) and specialized mechanic (class C). The specific requirements of each category of user may be subject to federal guidelines, which in turn may be subject to change. The inspection protocols provide for inspecting certain vehicle systems (e.g., lights, tire pressure, oil level, etc.) at certain intervals of time or distance traveled and making a record of the inspections. However, different individuals may be required to execute different inspections. It may generally be taken that the different classes look at the vehicle at different degrees of detail.

The identification of users is elementary. A user may be required to enter a user ID upon taking charge of a vehicle. With the ID a data base is interrogated (step 304) to identify the user with an inspection class (A, B or C). Operation is then channeled to the appropriate inspection routine, with the A class identified at step 306 and the "A" inspection routine being generated for the operator (step 308) and the results being stored at step 310. Similarly, steps 312, 314 provide for identification of B class users and execution of the B type inspection. Steps 316, 318 provide for confirmation of C class users and execution of a C type inspection. Execution of the routine loops until a user ID is entered. Result tables may be consulted, if desired, to determine if an item subject to periodic inspection may have recently been checked.

Inspections may be implemented by the use of relational database tables in which each tuple corresponds to an item to be inspected. While a relational database is not per se ordered, the primary key for each tuple may be a unique integer corresponding to the overall inspection order for a given item. Subsets of the entire relation/table then have a default order.

Tuples include fields identifying an inspection order (the primary key), a name of the item to be inspected (for display to the user) and maximum and minimum ranges if an attribute of the inspected item is quantifiable. Customization of the inspection routine is provided by including fields indicating inspection frequency (e.g. hours of operation of the engine, distance driven, passage of time, etc.) and which user types are supposed to carry out the inspection (e.g. driver, mechanic). For purposes of the present application a driver may be considered a subclass of a general mechanic for purposes of vehicle inspections. That is not to say that certain mechanics drive the vehicles, but that a particular type of mechanics inspection includes all items in a driver's inspection. Additional domains are defined for the identification of the actual inspector and the result of a particular inspection. Definition of the databases then may be taken as follows:

```
CREATE DOMAIN S#            CHAR(5);
CREATE DOMAIN P#            CHAR(5);
CREATE DOMAIN NAME          CHAR(20);
CREATE DOMAIN INSPECT BY    CHAR(2);
CREATE DOMAIN INSPECTOR     CHAR(10);
CREATE DOMAIN FREQ          CHAR (2);
CREATE DOMAIN QUANTIFIABLE  CHAR(1);
CREATE DOMAIN MAXIMUM       CHAR(5);
CREATE DOMAIN MINIMUM       CHAR(5);
CREATE DOMAIN AUTOMATED     CHAR(1);
CREATE DOMAIN RESULT        CHAR (5);
CREATE DOMAIN MILEAGE       CHAR(8);
```

Domains S and P relate to the primary keys for the inspection and result databases. The S domain may be used in the result databases built instead of provided a new domain definition. The domain "Name" is identification for display to a user or reviewer. The domain FREQ relates to maximum inspection intervals for components in terms of time or mileage. The domain "Quantifiable" identifies if an inspection item is measurable in some quantity such as pressure. Where something is quantifiable a range provided by maximum and minimum values is indicated. Things requiring manual inspection may be set using the Domain Automated field. Domain result indicates where the inspection value is placed. The mileage domain is the odometer reading at the time of an inspection. The term vehicle component is used somewhat broadly in the sense that a given component may have more than one physical attribute subject to inspection, e.g. disk brake pad width and temperature. Temperature may be detected by a sensor connected to the vehicle network while brake pad thickness may require driver visual inspection. Brake pad thickness may be quantified or may simply require check off that it meets a certain minimum thickness indicated by a mechanical attribute built into the pad and thus not be, in the sense contemplated by the database, "quantifiable". Definition of the databases is as follows.

```
CREATE TABLE I
  (I#        DOMAIN(S#)            NOT NULL,
   INAME     DOMAIN(NAME)          NOT NULL,
   IINSPECT  DOMAIN(INSPECT BY)    NOT NULL,
   IFREQ     DOMAIN(FREQ)          NOT NULL,
   IQUANT    DOMAIN(QUANTIFIABLE)  NOT NULL,
   IMAXIMUM  DOMAIN (MAXIMUM)      NOT NULL,
   IMINIMUM  DOMAIN(MINIMUM)       NOT NULL;
   IAUTO     DOMAIN(AUTOMATED)     NOT NULL;
```

```
CREATE TABLE R (for result)
  (R#   IR (P#)                     NOT NULL,
   INAME DOMAIN (NAME)              NOT NULL,
   IINSPECTOR DOMAIN (INSPECTOR)    NOT NULL,
   IRESULT DOMAIN (RESULT)          NOT NULL;
   IMILEAGE DOMAIN(MILEAGE)         NOT NULL
```

A series of tables conforming to R, each time stamped will be generated for production as required. The opportunity to adapt the inspection routine to more particular contexts can be effected by introducing new domains to Table I triggering inspections. For example, an item is included for inspection only if the user logged in is charged with inspection and the frequency value needs to be satisfied. In addition, a field can be added relating to nature of the trip, for example, across a yard or over the road. User classes can be made more detailed, down to point where inspections are literally unique to each prospective user.

Figure 5:
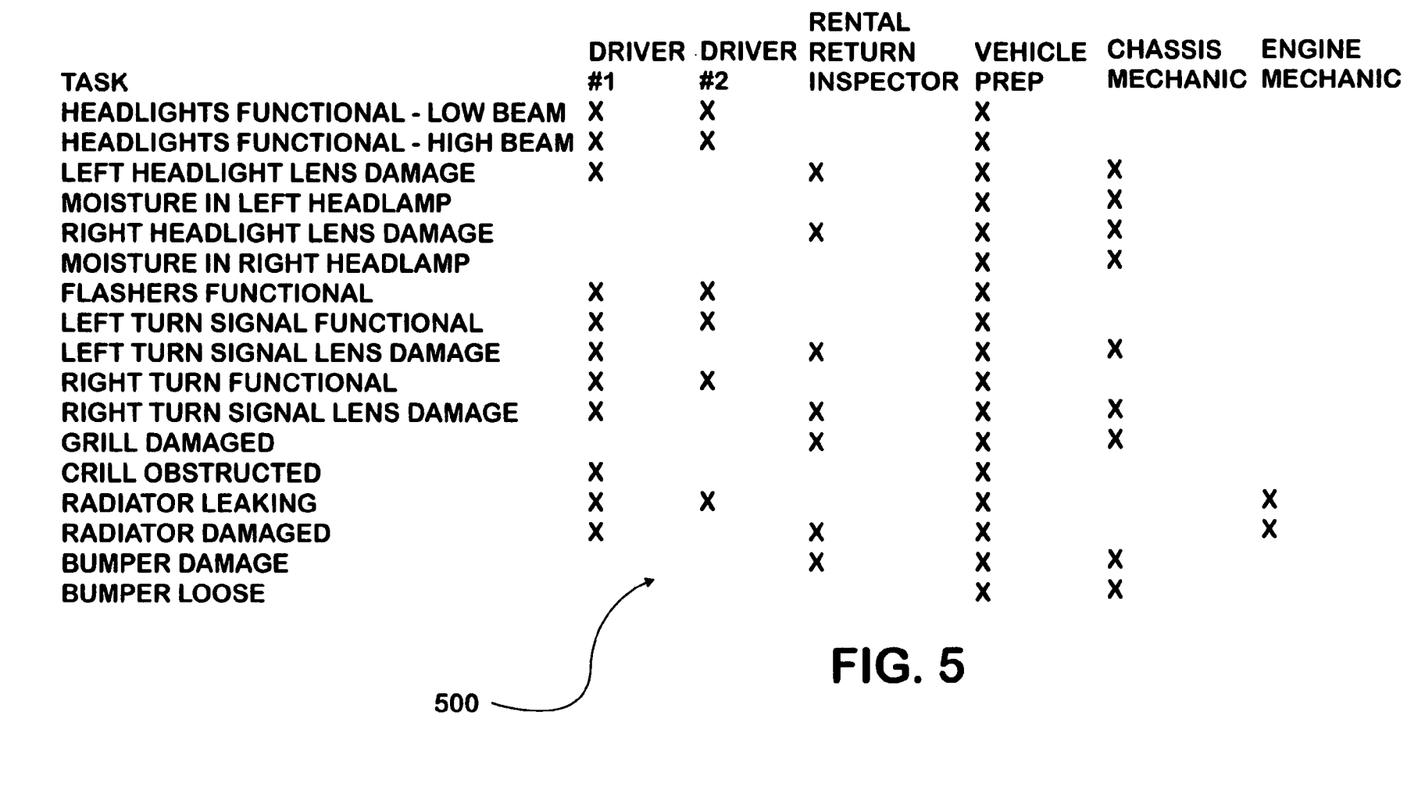
FIG. 5 is a spreadsheet illustration of a portion of an inspection protocol illustrating which users are assigned specific vehicle features for inspection.

FIG. 5 is a spreadsheet illustrating a subset of items for inspection, and which users, among a set of possible individuals with inspection responsibilities for the vehicle, are charged with inspecting particular items. The example is such as might be tailored for a rental operation for heavy duty equipment. Six users are identified including two drivers, a rental return inspector, a vehicle prep mechanic, a chassis mechanic and an engine mechanic. The items presented for inspection are those associated with the front end of the vehicle and are for the most part not amenable to automated inspection. As may be seen from the list, every item every user's schedule of inspection items is a reduced subset of the Vehicle preparation mechanic's list. In addition the second driver's list is a reduced subset of the first driver's list. Every item is inspected by at least two users.

While the invention is shown in only one of its forms, it is not thus limited but is susceptible to various changes and modifications without departing from the spirit and scope of the invention.

What is claimed is:

1. A motor vehicle comprising:
    an onboard computer with a user input/output interface;
    a controller area network coupled to the onboard computer;

a plurality of sensors providing vehicle condition related signals over the controller area network to the onboard computer;

a program for execution on the onboard computer, the program including program means for receiving input of user identification through the input/output interface and further program means for categorizing the user as being one of at least two distinct types for an inspection regimen; and an inspection database accessible by the onboard computer, the inspection database including tuples identifying vehicle components for inspection and indicating a user classification for making the inspection; and the program including program means prompting inspection by the user of vehicle components from the inspection database based on the user classification.

2. The motor vehicle of claim 1, further comprising:

the inspection database including a field for each tuple indicating inspection frequency; and means generating a timestamped database for each completed inspection indicating results.

3. A motor vehicle as set forth in claim 2, further comprising:

an inspection database field indicating intervals between inspection of vehicle components; and program means responsive to an indicated interval for inspection of a vehicle component and a time stamped inspection database for varying inclusion of a vehicle component in an inspection depending upon elapse of the interval.

4. A motor vehicle as set forth in claim 3, further comprising:

the inspection database indicating automatic or manual inspection for each vehicle component.

5. A vehicle inspection system comprising:

a plurality of vehicle components installed on a vehicle, the vehicle components having physical attributes subject to either automated or manual inspection;

an inspection database itemizing physical attributes for inspection and indicating an inspection category for each physical attribute;

means for a user to supply identification;

a computer for receiving the user supplied identification and for storing and accessing the inspection database;

a stored program installed on the computer for execution to identify the user supplied identification with an inspection category; and an input/output interface through which the stored program computer indicates to the user physical attributes of vehicle components to inspect, selecting such physical attributes as fall in the inspection category associated with the user.

6. A vehicle inspection system as set forth in claim 5, further comprising:

the user being prompted to enter results of the inspection into the input/output interface; and results of the inspection being stored for later retrieval.

7. A vehicle inspection system as set forth in claim 6, further comprising:

the inspection database indicating inspection intervals for vehicle component physical attributes.

8. A vehicle inspection system as set forth in claim 7, further comprising:

the computer being further programmed to generate result databases identified by user and interval indicating indicia.

9. A vehicle inspection system as set forth in claim 7, wherein the inspection database further provides that physical attributes indicated for inspection by an inspection category can all be included for inspection by another inspection category.

* * * * *